Sept. 26, 1950     R. F. GREBB     2,523,619
AUTOMATIC TRANSMISSION
Filed April 22, 1946     2 Sheets-Sheet 1
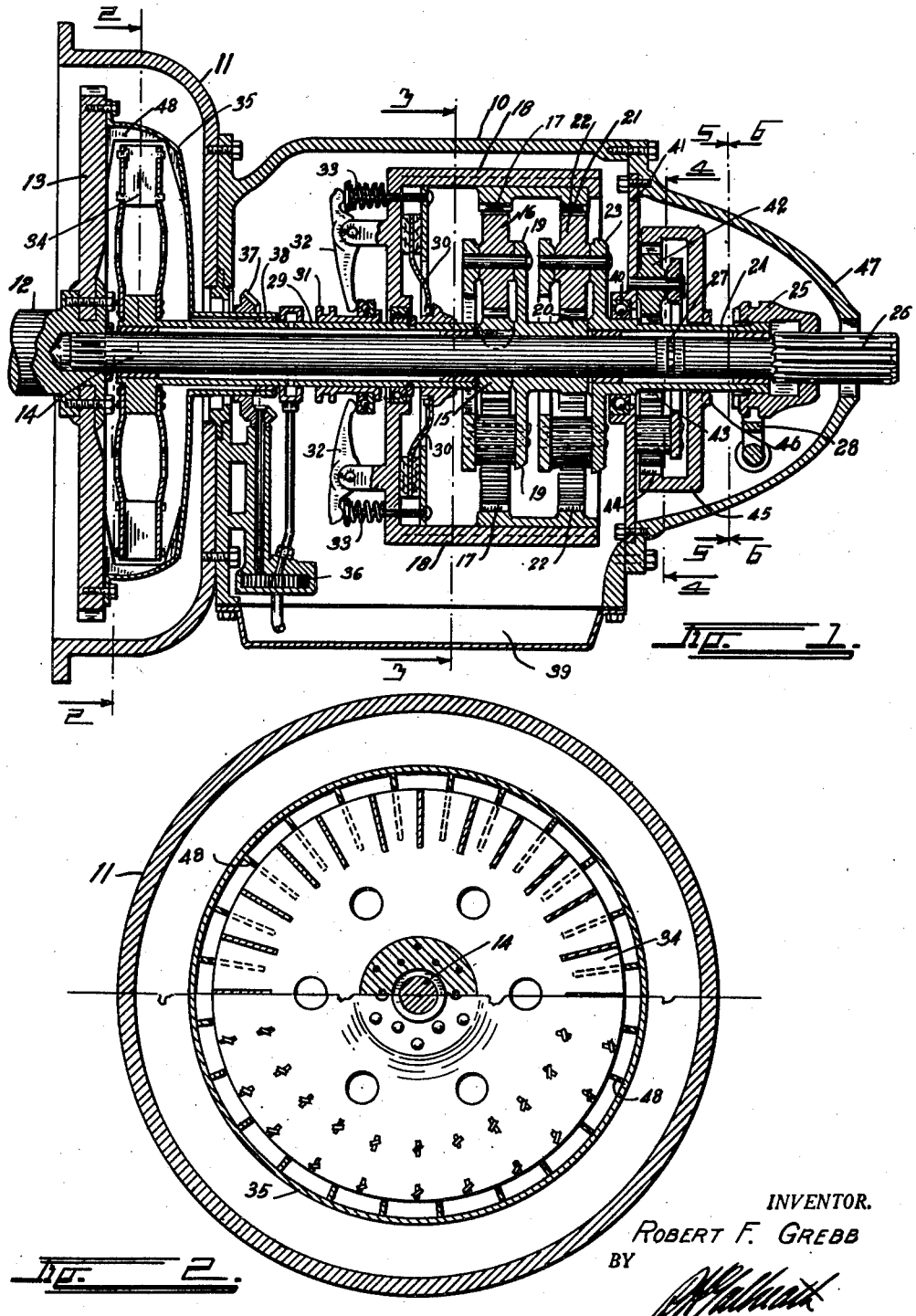
INVENTOR.
ROBERT F. GREBB
BY
ATTORNEY.

Sept. 26, 1950          R. F. GREBB          2,523,619
AUTOMATIC TRANSMISSION
Filed April 22, 1946          2 Sheets-Sheet 2
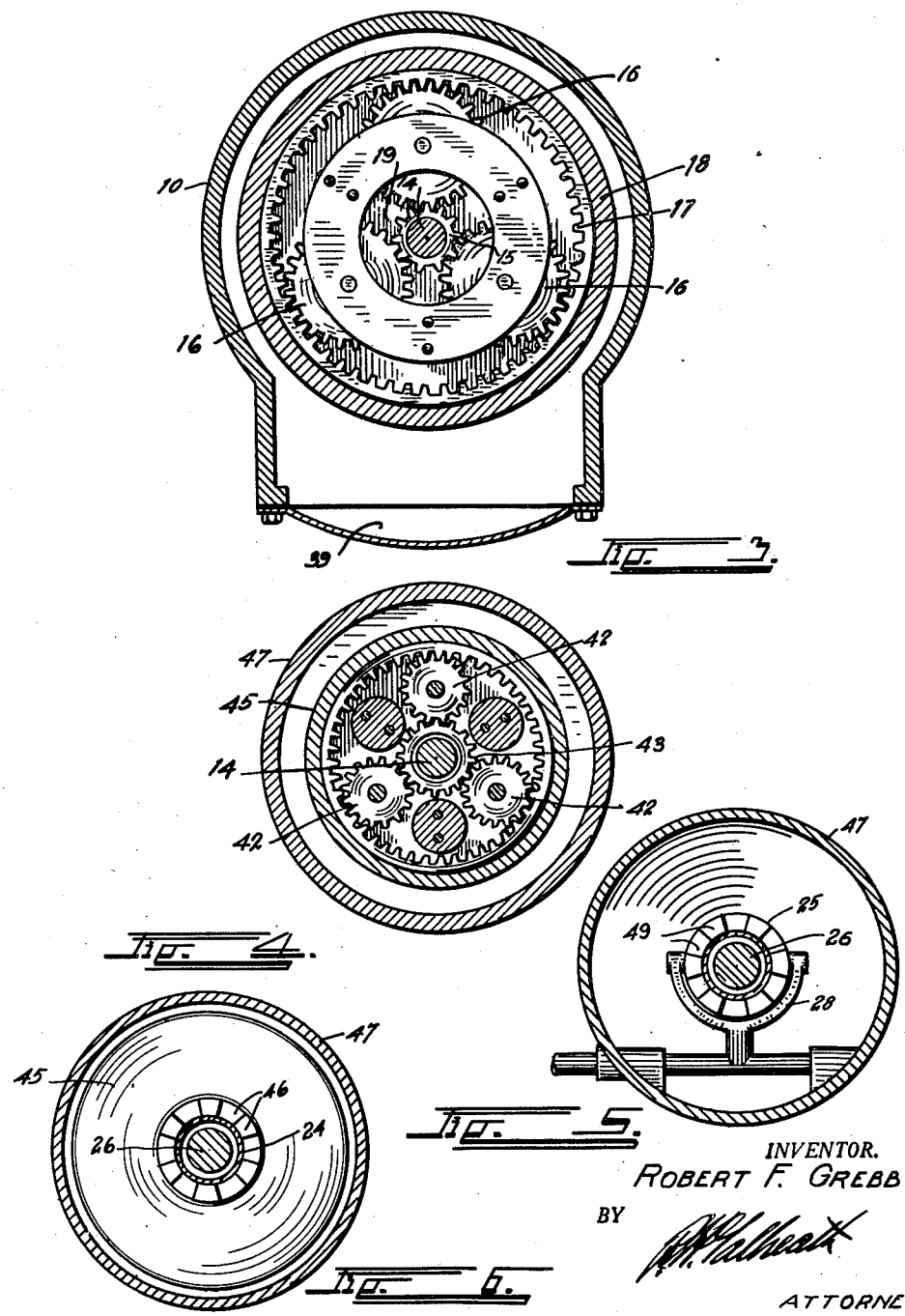
INVENTOR.
ROBERT F. GREBB
ATTORNEY.

Patented Sept. 26, 1950

2,523,619

UNITED STATES PATENT OFFICE 2,523,619

AUTOMATIC TRANSMISSION

Robert F. Grebb, Boise, Idaho

Application April 22, 1946, Serial No. 664,086

4 Claims. (Cl. 74—688)

This invention relates to an automatic fluid transmission for automotive vehicles and has for its principal object the provision of a simple and highly efficient device in which the increase or decrease of the gear ratio will be automatically controlled in accordance with the load demands without attention on the part of the operator.

A further object of the invention is to make use of the "slip" of a fluid clutch as a means for regulating the gear ratio of a planetary transmission.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a longitudinal section through the improved fluid transmission;

Fig. 2 is a cross section therethrough taken on the line 2—2, Fig. 1; and

Figs. 3, 4, 5 and 6 are similar cross sections taken on the lines 3—3, 4—4, 5—5, and 6—6, Fig. 1, respectively.

The improved transmission is mounted in a gear case 10 which in turn is mounted on a fly wheel housing 11. An engine shaft 12 enters the fly wheel housing 11 and carries a fly wheel 13 therein.

A drive shaft 14 is splined into the extremity of the engine shaft 12 so as to rotate in unison therewith. The drive shaft carries a drive gear 15 keyed thereto which rotates in constant mesh with a first set of planet gears 16. The first set of planet gears 16 are in constant mesh with a ring gear 17 fixedly mounted in a ring gear housing 18.

The planet gears 16 are carried on a planet gear spider 19 which is rotatably mounted on the drive shaft 14. A sun gear 20 is formed on the hub of the planet gear spider 19 and constantly meshes with a second set of planet gears 21.

The second set of planet gears 21 are in mesh with a second ring gear 22 fixedly mounted in the ring gear housing 18. The second set of planet gears 21 are carried on a second planet gear spider 23 provided with a hub 24 which is rotatably mounted on the drive shaft 14.

The extremity of the hub 24 is splined to slidably receive a toothed shifting clutch member 25.

The clutch member 25 is slidably splined upon a driven shaft 26 which is separated from the drive shaft 14 by means of a thrust bearing 27. The clutch member 25 can be shifted back and forth by means of a shifting yoke 28 or in any other desired manner.

A clutch sleeve 29 extends from a point adjacent the fly wheel 13 to a point adjacent the drive gear 15. The sleeve 29 is freely rotatable upon the drive shaft 14. A clutch disc 30 is secured on one extremity of the clutch sleeve and positioned, when engaged, to fix the clutch sleeve 29 to the ring gear housing 18. The clutch is operated through the medium of a sliding clutch collar 31, disengaging dogs 32, and clutch springs 33.

A bladed fluid clutch rotor 34 is fixedly mounted on the other extremity of the sleeve 29 adjacent the fly wheel 13. A fluid housing 35 is mounted on and sealed to the fly wheel 31 so as to surround the rotor 34. The clutch housing 35 is maintained full of oil by means of an oil pump 36 driven from a drive gear 37 on a hub 38 formed on the housing 35 and rotatably mounted on the sleeve 29. The housing 35 is provided with internal fluid vanes 48 which cooperate with the rotor 34 to create a fluid clutch between the rotor and the fly wheel 13.

The pump 36 forces oil through the sleeve 29 into the housing 35 and through suitable conventional oil channels to the other operating parts of the transmission. The oil returns to an oil sump 39 at the bottom of the case 10.

The forward extremity of the drive shaft 14 is supported by the engine shaft 12 and the rearward extremity is supported by means of the hub 24 which in turn is mounted in anti-friction bearings 40 in an end plate 41 in the end of the case 10.

Three reverse gears 42 are mounted on the end plate 41 so as to be in constant mesh with gear teeth 43 on the hub 24. The reverse gears 42 are in constant mesh with a reverse ring gear 44 fixed to a reversing drum 45 which is rotatably mounted on the hub 24. The drum 45 is provided with a toothed clutch hub 46 which can be engaged by the clutch member 25 when the latter is moved to the left in Fig. 1. The reversing mechanism and the clutch member are enclosed in a cap 47 on the end of the case 10.

Operation

Assuming the engine is running. This imparts a forward rotation, through the engine shaft 12 and the drive shaft 14, to the drive gear

15. This rotation causes the first set of planet gears 16 to rotate about their individual axes using the ring gear 17 as a traction gear. This causes the sun gear 20 to rotate forwardly at reduced speed. The sun gear 20 imparts a rearward rotation to the individual gears of the second set. The spider 23 is being held stationary by the stationary shaft 26. Therefore, the second set of planet gears 21 rotate the housing and the rotor 34 rearwardly due to the clutch 30 being normally engaged.

As the speed of the engine increases, the centrifugal action of the fluid in the housing 35 gradually stops the reverse rotation of the housing 18 causing the second set of planet gears to revolve forwardly about the axis of the drive shaft 14 carrying the driven shaft forward. The increased engine speed also accelerates the drive gear 15 which also accelerates the entire train to the driven shaft 26. Eventually a point will be reached when the rotor 34 will be rotating at the the speed of the housing 35. When this occurs, the entire mechanism within the housing 18 will rotate as a fixed unit transmitting power to the driven shaft 26 at a one to one ratio. Should the load increase on the driven shaft, the revolutions of the second planet gears 21 around the axis of the drive gear will be retarded causing them to act against the housing 18 as a traction gear and act to increase the gear ratio automatically. This increase is communicated through the first set of planet gears so that each assumes its part of the driving ratio.

To obtain a reverse movement, the clutch member 25 is slid to the left in Fig. 1 until it disengages the teeth on the hub 24 and engages the teeth 46 on the drum 45. Since the drum 45 is rotating in the opposite direction, due to the fixed axes of the reserve gears 42, the reverse movement will be imparted to the driven shaft.

The clutch in which the clutch disc 30 is embodied is not used for starting or stopping purposes. It is installed simply to provide a no-load idling position for the engine by disconnecting the clutch sleeve 29 from the gear housing 18.

It is desired to call attention to the fact that, when the clutch member 25 is slid to the left, it will engage the teeth 46 on the reverse drum 45 before it releases the teeth on the hub 24, so that there is no neutral or unlocked position. The shift is made, of course, when both members are stationary.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. An automatic fluid transmission comprising: a drive shaft; a sun gear fixed on said drive shaft; a planet gear support rotatably mounted on said drive shaft; a set of planet gears carried by said support in mesh with said drive gear; a ring gear in mesh with said planet gears; a fluid clutch transmitting rotation from said engine shaft to said ring gear; a sun gear driven by said support; a second planet gear support rotatable about the axis of said drive shaft; a second set of planet gears mounted on said second support in mesh with said sun gear; a second ring gear in mesh with said second set of planet gears, said second ring gear being fixed to said first ring gear; a driven shaft; and means for communicating the revolutions of said second support to said driven shaft.

2. In a hydraulic power transmitting device, the combination with an engine shaft and a driven shaft, of a drive shaft splined in the extremity of the engine shaft so as to rotate in unison therewith; a drive gear keyed to said drive shaft; a first set of planet gears in mesh with and surrounding said drive gear; a first planet gear spider rotatably mounted on said drive shaft and supporting said first set of planet gears; a hub projecting from said first spider; a sun gear fixed to said hub; a second set of planet gears in mesh with and surrounding said sun gear; a second planet gear spider rotatably mounted on said drive shaft and supporting said second set of planet gears; a second hub projecting from said second spider over the driven shaft; means for connecting said second hub to the driven shaft; a ring gear housing rotatably mounted about both sets of planet gears; a first ring gear fixed in said housing in mesh with said first set of planet gears; a second ring gear fixed in said housing in mesh with the second set of planet gears; and a fluid power transmission device interposed between said drive shaft and said housing for rotating the latter from the former.

3. In a hydraulic power transmitting device, the combination with an engine shaft and a driven shaft, of a drive shaft splined in the extremity of the engine shaft so as to rotate in unison therewith; a drive gear keyed to said drive shaft; a first set of planet gears in mesh with and surrounding said drive gear; a first planet gear spider rotatably mounted on said drive shaft and supporting said first set of planet gears; a hub projecting from said first spider; a sun gear fixed to said hub; a second set of planet gears in mesh with and surrounding said sun gear; a second planet gear spider rotatably mounted on said drive shaft and supporting said second set of planet gears; a second hub projecting from said second spider over the driven shaft; means for connecting said second hub to the driven shaft; a ring gear housing rotatably mounted about both sets of planet gears; a first ring gear fixed in said housing in mesh with said first set of planet gears; a second ring gear fixed in said housing in mesh with the second set of planet gears; a clutch sleeve rotatably surrounding said drive shaft and extending from a point within said housing to a point adjacent the splined extremity of said drive shaft; a clutch disc operated means for clutching said housing to said disc to cause the former to rotate with the latter; and a fluid power transmission device interposed between said drive shaft and said sleeve for rotating the latter at variable speeds from the former.

4. In a hydraulic power transmitting device, the combination with an engine shaft and a driven shaft, of a drive shaft splined in the extremity of the engine shaft so as to rotate in unison therewith; a drive gear keyed to said drive shaft; a first set of planet gears in mesh with and surrounding said drive gear; a first planet gear spider rotatably mounted on said drive shaft and supporting said first set of planet gears; a hub projecting from said first spider; a sun gear fixed to said hub; a second set of planet gears in mesh with and surrounding said sun gear; a second planet gear spider rotatably mounted on said drive shaft and supporting said second set of planet gears; a second hub projecting from said second spider over the driven shaft; means for connecting said second hub to the driven shaft; a ring gear housing rotatably mounted about both sets of planet gears; a first ring gear fixed in said housing in mesh with said first set of planet gears; a second ring gear fixed in said housing in mesh with the second set of planet gears; a clutch sleeve rotatably surrounding said drive shaft and extending from a point within said housing to a point adjacent the splined extremity of said drive shaft; a clutch disc mounted on said sleeve within said housing; manually operated means for clutching said housing to said disc to cause the former to rotate with the latter; a bladed fluid clutch rotor fixed to said clutch sleeve adjacent the splined extremity of said drive shaft; and a fluid containing housing fixed to the engine shaft and surrounding said rotor for imparting variable rotation from said engine shaft to said rotor.

ROBERT F. GREBB.

REFERENCES CITED

The following references are of record in the file of this patent:

UNITED STATES PATENTS

| Number | Name | Date |
| --- | --- | --- |
| 1,062,876 | Blymyer | May 27, 1913 |
| 1,203,265 | Radcliffe | Oct. 31, 1916 |
| 2,312,849 | Pollard | Mar. 2, 1943 |
| 2,391,333 | Nardone | Dec. 18, 1945 |

FOREIGN PATENTS

| Number | Country | Date |
| --- | --- | --- |
| 379,973 | Great Britain | Sept. 8, 1932 |
| 384,816 | Great Britain | Dec. 15, 1932 |